United States Patent [19]
Shiraishi et al.

[11] 3,951,861
[45] Apr. 20, 1976

[54] CATALYSTS FOR THE PREPARATION OF ACROLEIN

[75] Inventors: Tatsuo Shiraishi; Susumu Kishiwada; Shinkichi Shimizu; Shigeru Honmaru, all of Niihama; Akihiko Atsumi, Funahashi; Hiroshi Ichihashi; Yoshihiko Nagaoka, both of Niihama, all of Japan

[73] Assignee: Sumitomo Chemical Company, Limited, Japan

[22] Filed: Jan. 2, 1974

[21] Appl. No.: 429,947

Related U.S. Application Data

[62] Division of Ser. No. 262,489, June 14, 1972, abandoned.

[30] Foreign Application Priority Data
June 14, 1971 Japan.............................. 46-42310

[52] U.S. Cl................................ 252/437; 252/456; 252/464; 252/467
[51] Int. Cl.².................... B01J 27/14; B01J 23/14
[58] Field of Search........... 252/437, 456, 464, 467

[56] References Cited
UNITED STATES PATENTS

| | | |
|---|---|---|
| 3,445,521 | 5/1969 | Callahan et al................. 252/456 X |
| 3,640,900 | 2/1972 | McClellan et al................. 252/437 |
| 3,801,678 | 4/1974 | Shiraishi et al................. 252/464 X |

*Primary Examiner*—Carl F. Dees
*Attorney, Agent, or Firm*—Stewart and Kolasch, Ltd.

[57] ABSTRACT

A catalytic process for the preparation of acrolein by the vapor phase oxidation of propylene which comprises contacting propylene and oxygen with a catalyst composition comprising a catalyst system of the formula:

$Mo_aBi_bFe_cNi_dTl_eP_fX_gY_hO_i$ wherein X is one or more of Mg, Mn and Co, Y is one or more of Cu, Ca, Sr, Zn, Cd, Sn and Pb and $a, b, c, d, e, f, g, h$ and $i$ represent respectively the number of atoms, provided that, when $a$ is 12, $b$ is 0.1 to 5, $c$ is 0.1 to 12, $d$ is 0.1 to 12, $e$ is 1 or less but not 0, $f$ is 0 to 5, $g$ is 0 to 12, $h$ is 0.1 to 12 and $i$ is from 36 to 112. By such a process, acrolein is produced in a high selectivity and an excellent yield per each pass even at a large space velocity.

10 Claims, 1 Drawing Figure

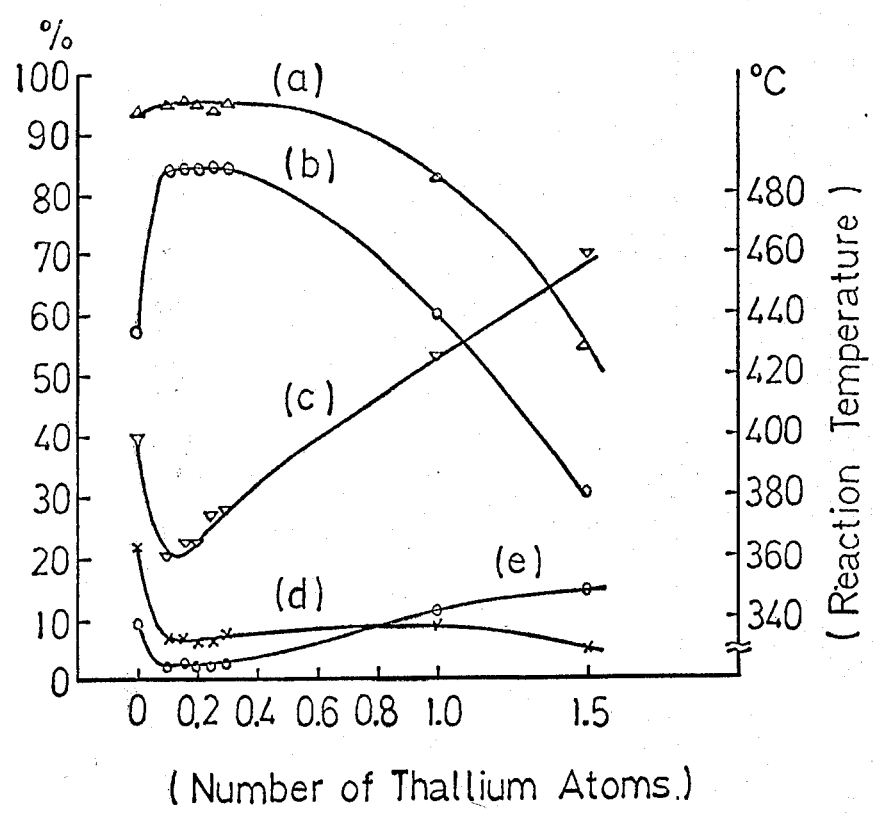

CATALYSTS FOR THE PREPARATION OF ACROLEIN

This application is a Divisional of copending application Ser. No. 262,489, filed on June 14, 1972 now abandoned.

The present invention relates to a catalytic process for the preparation of acrolein. More particularly, it relates to a process for the preparation of arcolein by the catalytic oxidation of propylene with oxygen in the presence of a specific catalyst system.

It is generally known that, in the vapor phase catalytic oxidation of olefinic hydrocarbons to the corresponding unsaturated aldehydes, the selection of an appropriate catalyst and suitable reaction conditions is essential for realizing the high conversion of the starting olefinic hydrocarbons and the excellent selectivity to the objective unsaturated aldehydes at large space velocities. In the production of acrolein from propylene, however, the elevation of the reaction temperature so as to attain a higher conversion of propylene usually results in a marked depression of the selectivity to acrolein. Because of this reason, a high yield of acrolein has been hitherto obtained not by adopting a high reaction temperature but by maintaining a low space velocity, insofar as conventional catalyst compositions are employed.

For the vapor phase oxidation of olefinic hydrocarbons, there have been proposed various catalyst compositions which comprise multi-elements in the oxide form, among which a catalyst system comprising Mo, Bi, P, at least one of Fe, Co and Ni, and O is particularly well known in view of the excellent conversion of the starting olefinic hydrocarbons [U.S. Pat. No. 3,454,630; German Pat. No. 1,268,609; French Pat. No. 1,514,167; Japanese Pat. publication No. 2324/1968; Japanese Pat. publication No. 5855/1969; Japanese Pat. publication No. 6245/1969, etc.]. When such catalyst compositions are applied to the vapor phase oxidation of propylene to acrolein, a high conversion of propylene and a high selectivity to acrolein will be simultaneously attained if the space velocity is relatively small. In case of the space velocity being made larger, however, the selectivity to acrolein is remarkably decreased. Thus, even these particular catalyst compositions are disadvantageous in essentially requiring a low space velocity for obtaining an excellent yield.

Apart from and in addition to the above disadvantage, the use of conventional catalyst compositions in the oxidation of olefinic hydrocarbons with high space velocities at elevated temperatures so as to increase the conversion of the olefinic hydrocarbons results in the by-production of carbon monoxide, carbon dioxide and the like in large amounts with marked generation of heat, whereby the control of the reaction conditions is made difficult.

In the course of the study seeking a catalyst composition provided with a favorable catalytic activity, it was previously found that a catalyst system comprising Mo, Bi, Fe, Ni, Tl, P and O overcomes the disadvantage as seen in conventional catalyst compositions. Thus, such catalyst system can convert propylene into acrolein in a high conversion and an excellent selectivity even at a high space velocity. In addition, the catalyst system is quite meritorious in suppressing markedly the production of by-products such as carbon monoxide, carbon dioxide and acrylic acid. The catalytic life of the catalyst system is, however, not sufficiently satisfactory.

As the result of further study, it has now been found that a catalyst system comprising Mo, Bi, Fe, Ni, Tl, P, at least one of Mg, Mn and Co, at least one of Cu, Ca, Sr, Zn, Cd, Sn and Pb, and O exhibits a more favorable catalytic activity in the conversion of propylene into acrolein than the said catalyst system does. That is, the former can afford acrolein from propylene in a higher conversion and a more excellent selectivity with a longer catalytic life than the latter.

According to the present invention, there is provided a process for the vapor phase oxidation of propylene which comprises contacting propylene and oxygen with a catalyst composition comprising a catalyst system of the formula: $Mo_aBi_bFe_cNi_dTl_eP_fX_gY_hO_i$ wherein X is one or more of Mg, Mn and Co, Y is one or more of Cu, Ca, Sr, Zn, Cd, Sn and Pb and $a$, $b$, $c$, $d$, $e$, $f$, $g$, $h$ and $i$ represent respectively the number of atoms, provided that, when $a$ is 12, $b$ is 0.1 to 5, $c$ is 0.1 to 12, $d$ is 0.1 to 12, $e$ is 1 or less but not 0, $f$ is 0 to 5, $g$ is 0 to 12, $h$ is 0.1 to 12 (preferably 1 to 6) and $i$ is from 36 to 112, depending on the number of the other atoms, to produce acrolein in a high selectivity and an excellent yield per each pass.

The starting materials in the vapor phase oxidation of this invention are propylene and oxygen. As the oxygen source, there may be used pure oxygen gas, air enhanced or unenhanced oxygen concentration or any other oxygen-containing gas. From the economical viewpoint, the use of air is preferred. As the case may be, steam is introduced into the reaction system. If desired, an appropriate inert gas such as nitrogen, carbon dioxide or argon may be used as a diluent. The molar ratio of propylene and oxygen may be within a range of 1 : 0.4 – 3. When steam is introduced, it may be used in a rate of 1 to 15 mol to 1 mol of propylene. In general, the preferred molar ratio of propylene, oxygen and steam is 1 : 1 – 3 : 3 – 10.

For preparation of the catalyst system, there may be employed molybdenum compounds (e.g. ammonium molybdate, molybdenum oxide, molybdic acid), bismuth compounds (e.g. bismuth nitrate, bismuth oxide), iron compounds (e.g. iron nitrate, iron oxide), nickel compounds (e.g. nickel nitrate, nickel oxide), manganese compounds (e.g. manganese nitrate, manganese oxide), magnesium compounds (e.g. magnesium nitrate, magnesium oxide), cobalt compounds (e.g. cobalt nitrate, cobalt oxide), copper compounds (e.g. copper nitrate, copper oxide), calcium compounds (e.g. calcium nitrate, calcium oxide), strontium compounds (e.g. strontrium nitrate, strontium oxide), zinc compounds (e.g. zinc nitrate, zinc oxide), cadmium compounds (e.g. cadmium nitrate, cadmium oxide), lead compounds (e.g. lead nitrate, lead oxide), tin compounds (e.g. tin chloride, tin oxide), thallium compounds (e.g. thallium nitrate, thallium oxide, thallium phoshate) and phosphorus compounds (e.g. phosphoric acid, ammonium phosphate).

The preparation of the catalyst composition may be executed by a par se conventional procedure. For instance, a bismuth salt, an iron salt, a nickel salt, a manganese salt, a magnesium salt, a cobalt salt, a copper salt, a calcium salt, a strontium salt, a zinc salt, a cadmium salt, a tin salt, a lead salt, a thallium salt and a phosphorus compound are added to an aqueous solution of a molybdate such as ammonium molybdate, the resulting slurry is admixed with a carrier material and evaporated to dryness, and the resultant cake is calcined at an elevated temperature in the atmosphere and, after cooling, crushed and shaped into pellets or granules.

The catalyst system may be used as such but is favorably incorporated with a suitable carrier (e.g. silica, alumina, silicon carbide, titanium oxide). The amount of the carrier is varied with its kind and may be usually less than 90 % by weight, preferably from 5 to 90 % by weight, of the catalyst composition.

The production of acrolein using the catalyst composition of the invention may be effected by a fluidized bed process or a fixed bed process. The particle size of the catalyst composition is not particularly limited and may be optionally varied with the type of its use. The reaction temperature is associated with the kind of the catalyst composition and is usually from 200° to 550°C, preferably from 250° to 500°C. The reaction pressure may be around atmospheric pressure, preferably 0.7 to 5 absolute atmospheres. The space velocity is ordinarily from 100 to 24,000 liter.gas/liter.catalyst/hr, preferably from 200 to 12,000 liter.gas/liter.catalyst/hr.

As stated above, a catalyst composition comprising Mo, Bi, Fe, Ni, Tl, P and O yields acrolein from propylene with a high conversion of propylene and an excellent selectivity to acrolein even at a large space velocity and a low reaction temperature. The incorporation of at least one of Cu, Ca, Sr, zn, Cd, Sn and Pb particularly together with at least one of Mg, Mn and Co into the said catalyst composition, as in the present invention, results in a higher conversion of propylene and a more excellent selectivity to acrolein with a marked suppression of the production of by-products such as acrylic acid, carbon monoxide and carbon dioxide at a lower reaction temperature. Particularly notable is the extreme prolongation of the catalytic life. For instance, even after the continuous oxidation for 50 days, the catalyst composition of the invention does not show any material depression in the acrolein yield (e.g. 84.2 % at the initiation and 84.5 % at the end).

Moreover, the catalyst composition of the invention is characteristic in containing a small amount of thallium. Compared with the corresponding catalyst system not containing Tl the Tl-containing catalyst system realizes a remarkably higher conversion of propylene and suppresses markedly the by-production of carbon monoxide, carbon dioxide and the like so that the selectivity to acrolein is highly increased. Attention is, however, directed to the fact that the incorporation of thallium in excess rather results in the inhibition of the production of acrolein. From these facts, it may be assumed that the catalytic mechanism of the Tl-containing catalyst system is different from that of the catalyst system not containing Tl and the thallium component in the Tl-containing catalyst system is present not in a mere oxide form but in a certain complex compound form. The said assumption can be supported also by the fact that, while thallium oxide is apt to be reduced in a reductive atmosphere to the lower oxide form or metallic thallium of high volatility, the Tl-containing catalyst system does not materially lose its catalytic activity even after its use in the continuous oxidation for 50 days and the non-volatilization of the thallium component therein is confirmed by the flourescent X-ray analysis.

Practical and presently preferred embodiments of the present invention are illustratively shown in the following Examples and Reference Examples, wherein the conversion of propylene, the selectivity to acrolein, the yield of acrolein and the space velocity are calculated respectively according to the equations:

$$\text{Conversion of propylene (\%)} = \frac{\text{Reacted propylene (mol)}}{\text{Feed propylene (mol)}} \times 100$$

$$\text{Selectivity to acrolein (\%)} = \frac{\text{Produced acrolein (mol)}}{\text{Reacted propylene (mol)}} \times 100$$

$$\text{Yield of acrolein (\%)} = \frac{\text{Produced acrolein (mol)}}{\text{Feed propylene (mol)}} \times 100$$

$$\text{Space velocity} = \frac{\text{Flow volume of feed gas per hour (liter.gas/hr)}}{\text{Volume of catalyst (liter.catalyst)}}$$

EXAMPLE 1

A solution of bismuth nitrate (12.13 g) in a mixture of concentrated nitric acid (4 ml) and water (30 ml) and a solution of ferric nitrate (20.20 g), zinc nitrate (14.86 g), nickel nitrate (47.34 g) and thallium nitrate (0.67 g) in water (250 ml) are combined together. To the resultant mixture, a solution of ammonium molybdate (52.98 g) and concentrated phosphoric acid (85 % by weight; 0.29 g) in a mixture of aqueous ammonia (28 % by weight; 30 ml) and water (300 ml) is added, and the mixture is stirred well to make slurry dispersion. Then, silica sol ($SiO_2$, 20 % by weight; 100 ml) is added thereto under vigorous stirring. The resultant slurry dispersion is evaporated to dryness, and the residue is calcined at 300°C for 3 hours (1st calcination), cooled and crushed. The obtained powder is tableted and calcined at 525°C for 6 hours in the atmosphere (2nd calcination) to give a catalyst composition, of which the active components correspond to the formula: $MO_{12}Bi_1Fe_2Ni_{6.5}Tl_{0.1}P_{0.1}Zn_2O_{49.4}$ (wherein the carrier component is omitted).

In a glass-made reaction tube of 12 mm in inner diameter, the catalyst composition as obtained above and crushed in granules of 10 to 16 mesh (8.0 ml) is charged and heated. Then, a gaseous mixture of propylene, air and steam (1 : 7 : 7 in molar ratio) is introduced into the reaction tube at 350°C and at a space velocity of 1,200 liter.gas/liter.catalyst/hr, whereby acrolein is produced. The conversion of propylene is 94.3 %, the selectivity to acrolein is 90.2 % and the yields of acrolein, acrylic acid, acetic acid, acetaldehyde, carbon dioxide and carbon monoxide are respectively 84.8 %, 5.8 %, 0.7 %, 0.3 %, 1.5 % and 0.8 %. The space time yield of acrolein is 3.03 mol/liter.catalyst/hr.

EXAMPLE 2

As in Example 1, there are prepared some catalyst compositions of which the active components correspond to the formula: $MO_{12}Bi_1Fe_2Ni_6Tl_eP_{0.1}Zn_3O_h$ wherein $e$ is 0 to 1.5 and $h$ is 49.8 to 52.0, i.e. (1) $MO_{12}Bi_1Fe_2Ni_6P_{0.1}Zn_3O_{49.8}$, (2) $MO_{12}Bi_1Fe_2Ni_6Tl_{0.1}P_{0.1}Zn_3O_{49.9}$, (3) $MO_{12}Bi_1Fe_2Ni_6Tl_{0.15}P_{0.1}Zn_3O_{50.0}$, (4) $MO_{12}$- acid and the total yield of carbon monoxide and carbon dioxide are respectively 7 and 3 %.

EXAMPLES 3 to 16

In the same manner as in Example 1 but using various catalyst compositions, the vapor phase oxidation of propylene to acrolein is carried out. The results are shown in Table 1.

Table 1

| Ex. No. | Catalyst composition | | | | | | | | Reaction condition | | Propylene conversion (%) | Yield (%) | | | | Space time yield (mol/l/hr) |
|---|---|---|---|---|---|---|---|---|---|---|---|---|---|---|---|---|
| | Mo | Bi | Fe | Ni | Tl | P | X | Y | O | Reaction temp. (°C) | Space velocity (l/l/hr) | | Acrolein | Acrylic acid | CO₂ | CO | |
| 3 | 12 | 1 | 2 | 6 | 0.3 | 0.1 | | (Ca)3 | 50.2 | 325 | 1,200 | 90.1 | 78.7 | 7.0 | 2.0 | 1.4 | 2.81 |
| 4 | 12 | 1 | 2 | 6 | 0.3 | 0.1 | | (Sr)3 | 50.2 | 375 | 1,200 | 93.4 | 74.7 | 11.3 | 2.8 | 2.5 | 2.67 |
| 5 | 12 | 1 | 2 | 7 | 0.1 | 0.1 | | (Cd)2 | 49.9 | 337 | 1,200 | 95.2 | 80.7 | 8.3 | 3.0 | 1.7 | 2.88 |
| 6 | 12 | 1 | 2 | 6.5 | 0.1 | 0.1 | | (Sn)2 | 51.4 | 365 | 1,200 | 95.5 | 82.7 | 8.0 | 1.8 | 1.0 | 2.96 |
| 7 | 12 | 1 | 2 | 6.5 | 0.1 | 0.1 | | (Pb)2 | 49.4 | 350 | 1,200 | 93.7 | 76.6 | 11.0 | 3.0 | 2.3 | 2.74 |
| 8 | 12 | 1 | 2 | 6 | 0.1 | 0.1 | | (Ca)1.5 (Zn)1.5 | 49.9 | 375 | 1,200 | 96.2 | 81.5 | 9.8 | 2.0 | 1.4 | 2.91 |
| 9 | 12 | 1 | 2 | 5 | 0.1 | 0.1 | (Mg)2 | (Zn)2 | 49.9 | 375 | 1,200 | 94.3 | 80.1 | 7.9 | 1.9 | 1.3 | 2.86 |
| 10 | 12 | 1 | 2 | 6 | 0.1 | 0.1 | | (Zn)1.5 (Sn)1.5 | 49.9 | 350 | 1,200 | 93.7 | 80.2 | 8.0 | 1.7 | 1.2 | 2.87 |
| 11 | 12 | 1 | 2 | 6 | 0.1 | 0.1 | (Mg)1 | (Cu)1 (Zn)1 | 49.9 | 375 | 1,200 | 95.4 | 83.0 | 8.1 | 1.8 | 1.3 | 2.97 |
| 12 | 12 | 1 | 2 | 6 | 0.1 | 0.1 | (Co)1 | (Cu)1 (Zn)1 | 49.9 | 375 | 1,200 | 96.2 | 82.8 | 8.8 | 1.6 | 1.2 | 2.96 |
| 13 | 12 | 1 | 2 | 6 | 0.1 | 0.1 | (Co)1 (Mg)1 | (Zn)1 | 49.9 | 350 | 1,200 | 96.6 | 83.3 | 9.0 | 1.6 | 1.2 | 2.98 |
| 14 | 12 | 1 | 2 | 6 | 0.1 | 0.1 | (Mn)1 | (Cu)1 (Zn)1 | 49.9 | 375 | 1,200 | 94.6 | 81.2 | 8.3 | 2.0 | 1.3 | 2.90 |
| 15 | 12 | 22 | 3 | 5 | 0.1 | 1 | | (Cd)2 | 53.2 | 385 | 1,200 | 95.7 | 81.8 | 8.6 | 1.8 | 1.5 | 2.92 |
| 16 | 12 | 1 | 1 | 6.5 | 0.1 | 0.1 | | (Zn)2 | 47.9 | 395 | 1,200 | 96.1 | 81.5 | 9.4 | 1.9 | 1.7 | 2.91 |

$Bi_1Fe_2Ni_6Tl_{0.2}P_{0.1}Zn_3O_{50.1}$, (5) $MO_{12}Bi_1Fe_2Ni_6Tl_{0.25}P_{0.1}Zn_3O_{50.1}$, (6) $MO_{12}Bi_1Fe_2Ni_6Tl_{0.3}P_{0.1}Zn_3O_{50.2}$, (7) $MO_{12}Bi_1Fe_2Ni_6Tl_{1.0}P_{0.1}Zn_3O_{51.3}$ and (8) $MO_{12}Bi_1Fe_2Ni_6Tl_{1.5}P_{0.1}Zn_3O_{52.0}$. A mixture of propylene, air and steam in a molar ratio of 1 : 7 : 7 is contacted with the above prepared catalyst composition at a space velocity of 1,200 liter.gas/liter.catalyst/hr as in Example 1. The results are shown in the Figure of the attached drawings wherein the number of thallium atoms ($e$) is indicated on the axis of the abscissa, the percent (%) is shown on the axis of the ordinate on the left side and the reaction temperature (°C) is represented on the axis of the ordinate on the right side. The curves $a$, $b$, $c$, $d$ and $e$ represent respectively the conversion of propylene, the yield of acrolein, the reaction temperature, the yield of acrylic acid and the total yield of carbon monoxide and carbon dioxide.

From the Figure, it can be seen that the catalyst composition (1) ($e = 0$) requires a temperature of 400°C for attaining a conversion of propylene more than 95 %, the increase of the thallium content in the catalyst compositions results in lowering the reaction temperature to be required for attaining the same result as above and the catalyst composition (2) ($e = 0.1$) shows a more than 95 % conversion of propylene even at a temperature of 360°C. But, a higher increase of the thallium content in the catalyst composition requires a higher reaction temperature for attaining a conversion of propylene more than 95 % and, when the catalyst compositions (7) ($e = 1.0$) and (8) ($e = 1.5$) are used, the conversion of propylene is extremely decreased.

It can also be seen that the by-production of acrylic acid, carbon monoxide and carbon dioxide is contrary to the above results. Namely, the catalyst composition (1) ($e = 0$) affords acrylic acid in a 22 % yield and carbon monoxide and carbon dioxide in a 9 % total yield. The inclusion of thallium results in the remarkable decrease of these yields and, in case of using the catalyst composition (6) ($e = 0.3$), the yield of acrylic

EXAMPLE 17

Using the catalyst composition as in Example 1, the vapor phase oxidation of propylene to acrolein is carried out continuously. The reaction conditions are as in Example 1 but the space velocity is 400 liter.gas/liter.catalyst/hr and the reaction temperature is 315°C. The following results are obtained: Propylene conversion, 96.9 %; acrolein yield, 82.3 %; acrylic acid yield, 8.1 %.

EXAMPLE 18

Using the catalyst composition as in Example 1, the vapor phase oxidation of propylene to acrolein is carried out continuously. The reaction conditions are as in Example 1 but the space velocity is 3,600 liter.gas/liter.catalyst/hr and the reaction temperature is 400°C. The following results are obtained: propylene conversion, 92.3 %; acrolein yield, 74.5 %; acrylic acid yield, 10.3 %; space time yield of acrolein, 7.99 mol/liter.catalyst/hr.

EXAMPLE 19

Using the catalyst composition as in Example 5, the vapor phase oxidation of propylene to acrolein is carried out continuously. The reaction conditions are as in Example 1 but the space velocity is 7,200 liter.gas/liter.catalyst/hr and the reaction temperature is 400°C. The following results are obtained: propylene conversion, 92.0 %; acrolein yield, 72.4 %; acrylic acid yield, 9.0 %; space time yield of acrolein, 15.1 mol/liter.catalyst/hr.

EXAMPLE 20

Using the catalyst composition as in Example 1, the vapor phase oxidation of propylene to acrolein is carried out continuously. The reaction conditions are as in Example 1 but the reaction time is 960 hours. The following results are obtained: propylene conversion, 93.1 %; acrolein yield, 81.5 %; acrylic acid yield, 7.0 %.

EXAMPLE 21

Using the catalyst composition as in Example 5, the vapor phase oxidation of propylene to acrolein is carried out continuously. The reaction conditions are as in Example 4 but the reaction time is 960 hours. The following results are obtained: propylene conversion, 93.7 %; acrolein yield, 77.5 %; acrylic acid yield, 9.4 %.

EXAMPLE 22

As in Example 1, there is prepared a catalyst composition of which the active components correspond to the formula: $Mo_{12}Bi_1Fe_4Ni_6Tl_{0.2}P_{0.1}Zn_3O_{53.1}$ (wherein the carrier component is omitted). Using this catalyst composition, the vapor phase oxidation of propylene to acrolein is carried out continuously as in Example 1 but the reaction temperature is 375°C. The following results are obtained: propylene conversion, 94.8 %; acrolein yield, 80.0 %; acrylic acid yield, 7.8 %; carbon dioxide yield, 2.0 %; carbon monoxide yield, 1.0 %.

EXAMPLE 23

As in Example 1, there is prepared a catalyst composition of which the active components correspond to the formula: $Mo_{12}Bi_1Fe_{7.5}Ni_6Tl_{0.4}P_{0.1}Zn_3O_{58.6}$ (wherein the carrier component is omitted). Using this catalyst composition, the vapor phase oxidation of propylene to acrolein is carried out continuously as in Example 1 but the reaction temperature is 400°C. The following results are obtained: propylene conversion, 94.7 %; acrolein yield, 77.8 %; acrylic acid yield, 8.5 %; carbon dioxide yield, 3.6 %; carbon monoxide yield, 2.6 %.

EXAMPLE 24

As in Example 1, there is prepared a catalyst composition of which the active components correspond to the formula: $Mo_{12}Bi_1Fe_2Ni_6Tl_{0.3}P_{0.1}Zn_{1.5}Mg_{1.5}O_{50.2}$ (wherein the carrier component is omitted). Using this catalyst composition, the vapor phase oxidation of propylene to acrolein is carried out continuously as in Example 1. When the reaction is effected at 375°C, the catalytic activity after one day is as follows: propylene conversion, 95.9 %; acrolein selectivity, 87.8 %; acrolein yield, 84.2 %. After executing the reaction for 50 consecutive days at the same temperature as above, the catalytic activity is as follows: propylene conversion, 93.6 %; acrolein selectivity, 90.3 %; acrolein yield, 84.5 %.

REFERENCE EXAMPLE 1

As in Example 1, there is prepared a catalyst composition of which the active components correspond to the formula: $Mo_{12}Bi_1Fe_1Ni_{8.5}P_{0.1}$ (wherein the carrier component is omitted). Using this catalyst composition, the vapor phase oxidation of propylene to acrolein is carried out continuously as in Example 1 but the reaction temperature is 400°C. The following results are obtained: propylene conversion, 90.9 %; acrolein yield, 52.6 %; acrylic acid yield, 21.5 %; carbon dioxide yield, 6.8 %; carbon monoxide yield, 5.3 %; space time yield of acrolein, 1.88 mol/liter.catalyst/hr.

REFERENCE EXAMPLE 2

As in Example 1, there is prepared a catalyst composition of which the active components correspond to the formula: $Mo_{12}Bi_1Fe_1Ni_{4.5}Co_4P_{0.08}O_{47.7}$ (wherein the carrier component is omitted). Using this catalyst composition, the vapor phase oxidation of propylene to acrolein is carried out continuously as in Example 1 but the reaction temperature is 400°C. The following results are obtained: propylene conversion 90.7 %; acrolein yield, 64.2 %; acrylic acid yield, 18.1 %; carbon dioxide yield, 4.2 %; carbon monoxide yield, 1.8 %; space time of acrolein, 2.29 mol/liter.catalyst/hr.

REFERENCE EXAMPLE 3

As in Example 1, there is prepared a catalyst composition of which the active components correspond to the formula: $Mo_{12}Bi_1Fe_1Ni_{8.5}Tl_{0.2}P_{0.1}O_{48.1}$ (wherein the carrier component is omitted). Using this catalyst composition, the vapor phase oxidation of propylene to acrolein is carried out continuously as in Example 1 but the reaction temperature is 375°C. The following results are obtained: propylene conversion, 96.1 %; acrolein yield, 78.4 %; acrylic acid yield, 9.8 %.

REFERENCE EXAMPLES 4 TO 10

In the same manner as in Example 1 but using various catalyst compositions which do not contain thallium, the vapor phase oxidation of propylene to acrolein is carried out. The results are shown in Table 2.

Table 2

| Reference Example No. | Catalyst composition | | | | | | | Reaction condition | | Propylene conversion (%) |
|---|---|---|---|---|---|---|---|---|---|---|
| | Mo | Bi | Fe | Ni | P | X | Y | O | Reaction temp. (°C) | Space velocity (1/l/hr) | |
| 4 | 12 | 1 | 2 | 6.5 | 0.1 | (Zn)2 | | 49.3 | 375 | 1,200 | 91.9 |
| 5 | 12 | 1 | 2 | 6 | 0.1 | (Ca)3 | | 49.8 | 400 | 1,200 | 84.8 |
| 6 | 12 | 1 | 2 | 6 | 0.1 | (Sr)3 | | 49.8 | 400 | 1,200 | 74.7 |
| 7 | 12 | 1 | 2 | 7 | 0.1 | (Cd)2 | | 49.8 | 400 | 1,200 | 81.7 |
| 8 | 12 | 1 | 2 | 6.5 | 0.1 | (Pb)2 | | 49.3 | 400 | 1,200 | 84.0 |
| 9 | 12 | 1 | 2 | 6 | 0.1 | (Zn)1(Cd)1(Sn)1 | | 49.8 | 400 | 1,200 | 92.4 |
| 10 | 12 | 1 | 2 | 6 | 0.1 | (Mg)(Cu)1(Zn)1 | | 49.8 | 400 | 1,200 | 90.3 |

| Reference Example No. | Yield (%) | | | | | Space time yield (mol/l/hr) |
|---|---|---|---|---|---|---|
| | Acrolein | Acrylic acid | CO$_2$ | CO | Acetaldehyde | |
| 4 | 60.7 | 18.1 | 4.1 | 3.3 | 5.2 | 2.17 |
| 5 | 47.6 | 12.5 | 8.6 | 7.6 | 4.8 | 1.70 |
| 6 | 38.6 | 11.2 | 9.8 | 8.8 | 4.3 | 1.38 |
| 7 | 48.4 | 10.6 | 8.4 | 6.7 | 5.0 | 1.73 |
| 8 | 52.0 | 9.5 | 8.5 | 5.7 | 5.1 | 1.86 |

Table 2-continued

| Reference Example No. | Catalyst composition | | | | | | | | Reaction condition | | Propylene conversion (%) |
|---|---|---|---|---|---|---|---|---|---|---|---|
| | Mo | Bi | Fe | Ni | P | X | Y | O | Reaction temp. (°C) | Space velocity (l/l/hr) | |
| 9 | | | | | | 57.1 | 20.4 | 5.3 | 4.3 | 4.3 | 2.04 |
| 10 | | | | | | 59.4 | 17.5 | 4.8 | 3.9 | 3.8 | 2.12 |

REFERENCE EXAMPLE 11

As in Example 1, there is prepared a catalyst composition of which the active components correspond to the formula: $Mo_{12}Bi_1Fe_2Ni_{6.5}Tl_{1.5}P_{0.1}Zn_2O_{51.5}$ (wherein the carrier component is omitted). Using this catalyst composition, the vapor phase oxidation of propylene to acrolein is carried out continuously as in Example 1 but the reaction temperature is 450°C. The following results are obtained: propylene conversion, 55.1 %; acrolein yield, 27.9 %.

REFERENCE EXAMPLE 12

Using the catalyst composition as in Reference Example 1, the vapor phase oxidation of propylene to acrolein is carried out continuously. The reaction conditions are as in Reference Example 1 but the reaction time is 120 hours. The following results are obtained: propylene conversion, 78.3 %; acrolein yield, 33.7 %; acrylic acid yield, 23.8 %.

REFERENCE EXAMPLE 13

Using the catalyst composition as in Reference Example 3, the vapor phase oxidation of propylene to acrolein is carried out continuously. The reaction conditions are as in Reference Example 3 but the reaction time is 480 hours. The following results are obtained: propylene conversion, 88.4 %; acrolein yield, 68.1 %; acrylic acid yield, 12.1 %.

REFERENCE EXAMPLE 14

As in Example 23, there is prepared a catalyst composition of which the active components correspond to the formula: $Mo_{12}Bi_1Fe_{7.5}Ni_6P_{0.1}Zn_3O_{58}$ (wherein the carrier component is omitted). Using this catalyst composition, the vapor phase oxidation of propylene to acrolein is carried out continuously as in Example 23. The following results are obtained: propylene conversion, 74.8 %; acrolein yield, 43.2 %; acrylic acid yield, 6.3 %; carbon dioxide yield, 15.1 %; carbon monoxide yield, 5.4 %; acetaldehyde yield, 3.2 %.

What is claimed is:

1. A catalyst composition comprising a catalyst system of the formula:

$$Mo_aBi_bFe_cNi_dTl_eP_fX_gY_hO_i$$

wherein X is one or more of Mg, Mn and Co, Y is one or more of Cu, Ca, Sr, Zn, Cd, Sn and Pb and $a$, $b$, $c$, $d$, $e$, $f$, $g$, $h$ and $i$ represent, respectively, the number of atoms and wherein $a$ is 12, $b$ is 0.1 to 5, $c$ is 0.1 to 12, $d$ is 0.1 to 12, $e$ is 1 or less but not less than a catalystic amount, $f$ is 0 to 5, $g$ is 0 to 12, $h$ is 0.1 to 12 and $i$ is a number determined by the valence requirements of the other atoms in the catalyst.

2. The catalyst composition according to claim 1, wherein $i$ is 36 to 112.

3. The catalyst composition according to claim 1, wherein $h$ is 1 to 6.

4. The catalyst composition according to claim 1, further including a carrier therefor.

5. The catalyst composition according to claim 4, wherein said carrier is selected from the group consisting of silica, alumina, silicon carbide and titanium oxide.

6. The catalyst composition according to claim 5, wherein the amount of the carrier is less than 90% by weight of said catalyst composition.

7. The catalyst composition according to claim 5, wherein the amount of the carrier is from 5 to 90% by weight of said catalyst composition.

8. A catalyst composition comprising a catalyst system of the formula:

$$Mo_aBi_bFe_cNi_dTl_eP_fX_gY_hO_i$$

wherein X is one or more of Mg, Mn and Co, Y is one or more of Cu, Ca, Sr, Zn, Cd, Sn and Pb and $a$, $b$, $c$, $d$, $e$, $f$, $g$, $h$ and $i$ represent, respectively, the number of atoms and wherein $a$ is 12, $b$ is 0.1 to 5, $c$ is 0.1 to 12, $d$ is 0.1 to 12, $e$ is 0.1 to 1.0, $f$ is 0 to 5, $g$ is 0 to 12, $h$ is 0.1 to 12 and $i$ is 36 to 112, the value of $i$ being determined by the valence requirements of the other atoms in the catalyst.

9. The catalyst composition according to claim 8, wherein $e$ is 0.1 to 0.4.

10. The catalyst composition according to claim 8, wherein $e$ is 0.1 to 0.3.